US011622317B2

(12) United States Patent
Jonnala et al.

(10) Patent No.: US 11,622,317 B2
(45) Date of Patent: Apr. 4, 2023

(54) SYSTEMS AND METHODS FOR IDENTIFYING NARROW BAND DEVICES IN WIRELESS COMMUNICATION NETWORKS

(71) Applicant: T-Mobile USA, Inc., Bellevue, WA (US)

(72) Inventors: Deepthi Jonnala, Renton, WA (US); Subramania Kaushik, Bellevue, WA (US); Phani Ramisetty, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/440,105

(22) Filed: Jun. 13, 2019

(65) Prior Publication Data

US 2019/0387460 A1 Dec. 19, 2019

Related U.S. Application Data

(60) Provisional application No. 62/686,948, filed on Jun. 19, 2018.

(51) Int. Cl.
*H04W 48/16* (2009.01)
*H04W 4/80* (2018.01)
(Continued)

(52) U.S. Cl.
CPC ............ *H04W 48/16* (2013.01); *H04W 4/80* (2018.02); *H04W 8/04* (2013.01); *H04W 8/08* (2013.01); *H04W 8/245* (2013.01); *H04W 8/26* (2013.01)

(58) Field of Classification Search
CPC ....... H04W 48/16; H04W 4/80; H04W 8/245; H04W 8/04; H04W 8/08; H04W 8/26; H04W 4/70
See application file for complete search history.

(56) References Cited

U.S. PATENT DOCUMENTS 10,277,631 B1* 4/2019 Gemeniano ........... H04L 67/125
2007/0086381 A1* 4/2007 Lee ................... H04W 28/0268
370/331

(Continued)

FOREIGN PATENT DOCUMENTS

KR 1020080084863 A 9/2008
WO WO2017164674 A1 9/2017

OTHER PUBLICATIONS

The PCT Search Report and Written Opinion dated Oct. 2, 2019, for PCT Application No. PCT/US2019/037323, 10 pages.

*Primary Examiner* — Mounir Moutaouakil

(74) *Attorney, Agent, or Firm* — Lee & Hayes, P.C.

(57) ABSTRACT

Techniques and architecture are provided for preventing narrow band (NB) SIMs from being used in a non-NB devices, e.g., high bandwidth devices such as, for example, smartphones, tablets, etc. In configurations, a user device is provisioned based upon a NB international mobile subscriber identity (IMSI), a NB-indicator and a type allocation code (TAC) combination. An IMSI, NB-indicator and TAC mismatch helps prevent NB-SIMs from being used in a non-NB device. In configurations, when a user device attempts to access or register with a wireless communication network via a narrow band network of the wireless communication network, the wireless communication network will verify the IMSI, the NB-indicator and the NB-TAC combination for the user device in order to allow the user device to access the narrow band network of the wireless communication network.

17 Claims, 5 Drawing Sheets

(51) Int. Cl.
    *H04W 8/24*     (2009.01)
    *H04W 8/04*     (2009.01)
    *H04W 8/08*     (2009.01)
    *H04W 8/26*     (2009.01)

(56) References Cited

U.S. PATENT DOCUMENTS

| | | | |
|---|---|---|---|
| 2013/0064119 A1 | 3/2013 | Montojo et al. | |
| 2013/0203450 A1* | 8/2013 | Mochizuki | H04W 68/02 |
| | | | 455/458 |
| 2015/0078329 A1* | 3/2015 | Zhu | H04W 4/70 |
| | | | 370/330 |
| 2015/0341897 A1 | 11/2015 | Zhu et al. | |
| 2017/0238223 A1* | 8/2017 | Zhou | H04W 36/0038 |
| | | | 370/328 |
| 2018/0014337 A1* | 1/2018 | Kuge | H04W 48/17 |
| 2018/0035351 A1 | 2/2018 | Kodaypak | |
| 2019/0090120 A1* | 3/2019 | Kappla | H04W 8/04 |
| 2019/0116531 A1* | 4/2019 | Ryu | H04W 4/70 |

\* cited by examiner

SYSTEMS AND METHODS FOR IDENTIFYING NARROW BAND DEVICES IN WIRELESS COMMUNICATION NETWORKS

PRIORITY CLAIM AND CROSS-REFERENCE TO RELATED APPLICATIONS

This Application is a non-provisional of, and claims priority under 35 USC § 119(e), to U.S. Provisional Patent Application No. 62/686,948, filed Jun. 19, 2018, which is fully incorporated by reference herein as if fully set forth below.

BACKGROUND

In recent years, mobile devices have advanced from offering simple voice calling services within wireless communication networks to providing users with many new features. Mobile devices now provide messaging services such as email, text messaging, and instant messaging; data services such as internet browsing; media services such as storing and playing a library of favorite songs; location services; and many others. In addition to the new features provided by the mobile devices, users of such mobile devices have greatly increased. Such an increase in users is only expected to continue and, in fact, it is expected that there could be a growth rate of twenty times more users in the next few years alone.

Some wireless communication networks also offer narrow band networks, e.g., constrained radio networks, meant for low bandwidth devices. Such narrow band networks generally should not be used for general data traffic by mobile devices such as, for example, smartphones, tablets, etc. The narrow band networks are primarily meant for use by low constrained devices, often configured as Internet of Things (IoT) devices. Examples of narrow band devices include, for example, tracking devices, e.g., tracking for pets, vehicles, boats, and even people, level indicators, e.g., trash cans, fuel tanks, water tanks, etc. Such narrow band devices are usually in a "sleep," e.g., low-power, mode and when the narrow band devices need data, the narrow band devices "wake up," e.g., become active, collect the data and send the data to the appropriate party or parties. Afterwards, the narrow band devices go back to sleep. Thus, the narrow band devices intermittently use data provided by the narrow band network of a wireless communication network.

Subscriber Identity (or Identification) Modules (SIMs) have a similar form factor as other regular SIMs. In other words, SIMs for narrow band devices are similar in size, shape and appearance when compared to standard SIMs utilized for high bandwidth devices such as, for example, smartphones and other portable electronic devices that access wireless communication networks for various services such as, voice services, interne access, messaging services, and other data services. Unfortunately, due to the similarities in appearance of SIMs for narrow band devices and the standard SIMs for high bandwidth devices, high bandwidth devices may inadvertently utilize a narrow band SIM.

When such a high bandwidth device registers with the wireless communication network using a narrow band SIM, the high bandwidth device will receive services from the wireless communication network via the narrow band network of the wireless communication network. In such a situation, the high bandwidth device will receive the services at slower speeds, thus resulting in a poor user experience on the high bandwidth device. Additionally, the high bandwidth device will receive the services via data provided by the narrow band network. The data provided by the narrow band network is generally provided based upon a different rate plan from the operator of the wireless communication network. Often such rate plans are based upon hourly use or amount of data used. Once the time or data provided by the rate plan is used, the rate plan automatically renews. Thus, the user may accumulate high charges for receiving services from the wireless communication network based upon data used provided by the narrow band network.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
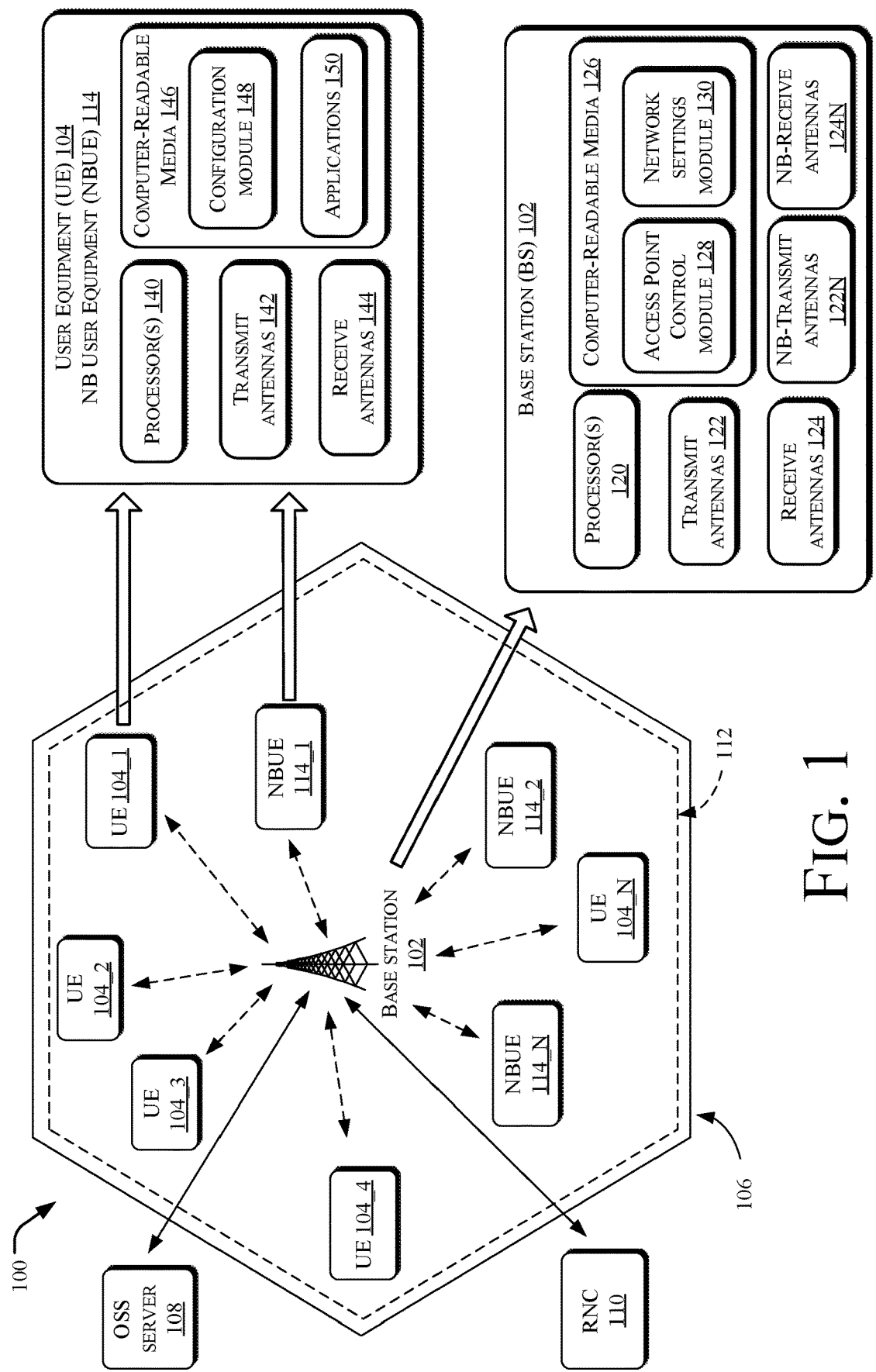
FIG. 1 schematically illustrates an example of a wireless communication network that includes a narrow band network, in accordance with various configurations.

Described herein are techniques and architecture for preventing narrow band (NB) SIMs from being used in a non-NB devices, e.g., high bandwidth user devices such as, for example, smartphones, tablets, etc. In configurations, a user device is provisioned based upon a NB international mobile subscriber identity (IMSI), a NB-indicator, and a type allocation code (TAC) combination. An IMSI, NB-indicator and TAC mismatch helps prevent NB-SIMs from being used in a non-NB device. When a user device attempts to access a narrow band network of a wireless communication network, only devices with certified TACs for narrow band devices are allowed to access the narrow band network. For example, in configurations, when a user device attempts to access or register with a wireless communication network via a narrow band network of the wireless communication network, the wireless communication network will verify the NB IMSI, the NB-indicator, e.g., a NB-rate plan, and the NB-TAC combination for the user device in order to allow the user device to access the narrow band network of the wireless communication network.

In particular, when a wireless communication network provisions a user device, a device qualification assurance (DQA) team will complete a device certification that the user device is configured as a narrow band device, e.g., the DQA team will certify that the user device is "good to go" for use on the narrow band network of the wireless communication network. A TAC for the user device is loaded into the TAC database of the wireless communication network. An equipment identity register (EIR) of the wireless communication network white lists the TAC against a NB IMSI range.

A NB-SIM is activated with a narrow band rate plan. A switch control node of the wireless communication network, which generally serves as the main billing node for the wireless communication network, receives the provision or activation request and forwards a NB-indicator with the device IMSI and rate plan information to one or both of a Home Location Register (HLR) node of the wireless communication network or a Home Subscriber Server (HSS) node of the wireless communication network. In configurations, the NB-indicator is the NB-rate plan. The EIR of the wireless communication network may also white list the IMSI and the NB-indicator, e.g., the NB-rate plan indicator for the narrow band network, with the NB-TAC.

When a user device attempts to attach to or register with the narrow band network of the wireless communication network, a Mobile Management Entity (MME) of the wireless communication network checks with one or more of the HSS node, HLR node and/or the EIR node of the wireless communication network. The appropriate node(s) check if the IMSI and NB-indicator, e.g., NB-rate plan, combination matches with the NB-TAC. If all three of the IMSI, the NB-indicator and the NB-TAC match, then the user device is authenticated as an appropriate narrow band device and is allowed to access the narrow band network of the wireless communication network.

Depending upon whether the narrow band device is attempting to access the narrow band network via an internet protocol (IP) configuration or a non-IP configuration, the MME connects the narrow band device with an appropriate application server via either a serving gateway/packet data network gateway (SPGW) of the wireless communication network or a service capability exposure function (SCEF) of the wireless communication network. If any of the IMSI, the NB-indicator and the NB-TAC do not match with the information stored in the HSS node, HLR node and/or EIR of the wireless communication network (or is missing, e.g., the NB-indicator), then the user device is not allowed to register with the narrow band network. Thus, non-NB devices may be prevented from accessing and utilizing data from a narrow band network of a wireless communication network, even if the non-NB devices attempt to use a NB-SIM to access the wireless communication network. This can improve user experience, as well as prevent unwanted or unnecessary high charges for data use.

FIG. 1 schematically illustrates an example wireless communication network 100 (also referred to herein as network 100). The network 100 comprises a Base Station (BS) 102 communicatively coupled to a plurality of user devices or user equipment, referred to as User Equipment (UE) 104_1, 104_2, . . . , 104_N, where N is an appropriate integer. The BS 102 serves UEs 104 located within a geographical area, e.g., within a macro cell 106. FIG. 1 illustrates the macro cell 106 to be hexagonal in shape, although other shapes of the macro cell 106 may also be possible. In general, the network 100 comprises a plurality of macro cells 106, with each macro cell 106 including one or more BSs 102. In configurations, the macro cells 106 may be divided into small cells (not illustrated), e.g., femto cells, pico cells, micro cells, or the like. The multiple macro cells 106 and small cells may be organized into multiple subnetworks that make up the wireless communication network 100. For example, the wireless communication network 100 may be a national network and, thus, the wireless communication network 100 may be divided into four regional subnetworks, where each regional subnetwork includes multiple macro cells 106 that may be divided into small cells.

In a configuration, the UEs 104_1, . . . , 104_N may comprise any appropriate devices, e.g., stationary devices, portable electronic devices or mobile devices, for communicating over a wireless communication network. Such devices include mobile telephones, cellular telephones, internet protocol (IP) telephones, mobile computers, Personal Digital Assistants (PDAs), radio frequency devices, handheld computers, laptop computers, tablet computers, palmtops, pagers, devices configured as IoT devices, IoT sensors that include cameras, integrated devices combining one or more of the preceding devices, and/or the like. As such, UEs 104_1, . . . , 104_N may range widely in terms of capabilities and features. For example, one of the UEs 104_1, . . . , 104_N may have a numeric keypad, a capability to display only a few lines of text and be configured to interoperate with only Global System for Mobile Communications (GSM) networks. However, another of the UEs 104_1, . . . , 104_N (e.g., a smart phone) may have a touch-sensitive screen, a stylus, an embedded GPS receiver, and a relatively high-resolution display, and be configured to interoperate with multiple types of networks. UEs 104_1, . . . , 104_N may also include SIM-less devices (i.e., mobile devices that do not contain a functional subscriber identity module ("SIM")), roaming mobile devices (i.e., mobile devices operating outside of their home access networks), and/or mobile software applications.

In a configuration, the BS 102 may communicate voice traffic and/or data traffic with one or more of the UEs 104_1, . . . , 104_N using RF signals. The BS 102 may communicate with the UEs 104_1, . . . , 104_N using one or more appropriate wireless communication protocols or standards. For example, the BS 102 may communicate with the UEs 104_1, . . . , 104_N using one or more standards, including but not limited to GSM, Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Fifth Generation (5G), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), Wi-Fi protocols (including IEEE 802.11 protocols), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The BS 102 may be communicatively coupled (e.g., using a backhaul connection, illustrated using solid lines in FIG. 1) to a number of backhaul equipments, e.g., an Operation Support Subsystem (OSS) server 108, a Radio Network Controller (RNC) 110, and/or the like. In configurations, the RNC 110 can also be in the form of a Mobility Management Entity (MME) that serves as a gateway when the wireless communication network 100 operates according to the LTE standard or LTE Advanced standard, as will be discussed further herein.

In configurations, the wireless communication network 100 provides a narrow band network 112, e.g., a constrained radio network with channels generally below 500 kHz, such that the BS 102 is communicatively coupled to a plurality of user devices configured as narrow band user equipment, referred to as Narrow Band User Equipment (NBUE) 114_1, 114_2, ..., 114_N, where N is an appropriate integer. The narrow band network 112 generally should not be used for general data traffic by UEs 104. The narrow band network 112 is primarily meant for use by low constrained devices, e.g., NBUEs 114, often configured as Internet of Things (IoT) devices. Examples of narrow band devices include, for example, tracking devices, e.g., tracking for pets, vehicles, boats, (and even people), level indicators, e.g., trash cans, fuel tanks, water tanks, etc.

In a configuration, the base station 102 may comprise processor(s) 120, one or more transmit antennas (transmitters) 122, one or more receive antennas (receivers) 124, and computer-readable media 126. The processor(s) 120 may be configured to execute instructions, which may be stored in the computer-readable media 126 or in other computer-readable media accessible to the processor(s) 120. In some configurations, the processor(s) 120 are a Central Processing Unit (CPU), a Graphics Processing Unit (GPU), or both CPU and GPU, or any other sort of processing unit. The base station 102 can also be in the form of, for example, a Node B (where the wireless communication network 100 is a 3G UMTS network), in the form of an eNodeB (where the wireless communication network 100 operates according to the LTE standard or LTE Advanced standard), in the form of a gNodeB (where the wireless communication network 100 operates according to the 5G standard), etc.

The one or more transmit antennas 122 may transmit signals to the UEs 104_1, ..., 104_N, and the one or more receive antennas 124 may receive signals from the UEs 104_1, ..., 104_N. The antennas 122 and 124 include any appropriate antennas known in the art. For example, antennas 122 and 124 may include radio transmitters and radio receivers that perform the function of transmitting and receiving radio frequency communications. In a configuration, the antennas 122 and 124 may be included in a transceiver component of the BS 102.

In configurations, one or more NB-transmit antennas 122N may transmit signals to one or more NBUEs 114_1, ..., 114_N registered with the narrow band network 112 of the wireless communication network 100, and the one or more NB-receive antennas 124N may receive signals from one or more NBUEs 114_1, ..., 114_N registered with the narrow band network 112 of the wireless communication network 100. The NB-antennas 122N and 124N include any appropriate antennas known in the art. For example, NB-antennas 122N and 124N may include radio transmitters and radio receivers that perform the function of transmitting and receiving radio frequency communications for the narrow band network 112, e.g., a constrained radio network. In a configuration, the NB-antennas 122N and 124N may be included in a transceiver component of the BS 102.

The computer-readable media 126 may include Computer-Readable Storage Media ("CRSM"). The CRSM may be any available physical media accessible by a computing device to implement the instructions stored thereon. CRSM may include, but is not limited to, Random Access Memory ("RAM"), Read-Only Memory ("ROM"), Electrically Erasable Programmable Read-Only Memory ("EEPROM"), flash memory or other memory technology, Compact Disc Read-Only Memory ("CD-ROM"), Digital Versatile Discs ("DVD") or other optical disk storage, magnetic cassettes, magnetic tape, magnetic disk storage or other magnetic storage devices, or any other medium which can be used to store the desired information and which can be accessed by the base station 102. The computer-readable media 126 may reside within the base station 102, on one or more storage devices accessible on a local network to the base station 102, on cloud storage accessible via a wide area network to the base station 102, or in any other accessible location.

The computer-readable media 126 may store modules, such as instructions, data stores, and so forth that are configured to execute on the processor(s) 120. For instance, the computer-readable media 126 may store an access point control module 128 and a network settings module 130, as will be discussed in more detail herein later.

Although FIG. 1 illustrates the computer-readable media 126 in the BS 102 storing the access point control module 128 and the network settings module 130, in various other configurations, the access point control module 128, the network settings module 130, and one or more other modules (not illustrated, may be stored in another component of the network 100 (e.g., other than the BS 102). For example, one or more of these modules may be stored in a computer-readable media included in the OSS server 108, the RNC 110, another appropriate server associated with the network 100, and/or the like.

Although not illustrated in FIG. 1, various other modules (e.g., an operating system module, Basic Input/Output Systems (BIOS), etc.) may also be stored in the computer-readable media 126. Furthermore, although not illustrated in FIG. 1, the base station 102 may comprise several other components, e.g., a power bus configured to supply power to various components of the base station 102, one or more interfaces to communicate with various backhaul equipment, and/or the like.

In a configuration, the UEs 104 and the NBUEs 114 may comprise processor(s) 140, one or more transmit antennas (transmitters) 142, one or more receive antennas (receivers) 144, and computer-readable media 146 in the form of memory and/or cache. The processor(s) 140 may be configured to execute instructions, which may be stored in the computer-readable media 146 or in other computer-readable media accessible to the processor(s) 140. In some configurations, the processor(s) 140 is a Central Processing Unit (CPU), a Graphics Processing Unit (GPU), or both CPU and GPU, or any other sort of processing unit. The one or more transmit antennas 142 may transmit signals to the base station 102, and the one or more receive antennas 144 may receive signals from the base station 102. In configurations, the NBUE 114 antennas 142 and 144 may include radio transmitters and radio receivers that perform the function of transmitting and receiving radio frequency communications for the narrow band network 112, e.g., a constrained radio network. In a configuration, the antennas 142 and 144 may be included in a transceiver component of the UE 104.

The computer-readable media 146 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 104.

The computer-readable media 146 may store several modules, such as instructions, data stores, and so forth that are configured to execute on the processor(s) 140. For instance, the computer-readable media 146 may store a configuration module 148. In configurations, the computer-readable media 146 may also store one or more applications 150 configured to receive and/or provide voice, data and messages (e.g., Short Message Service (SMS) messages, Multi-Media Message Service (MMS) messages, Instant Messaging (IM) messages, Enhanced Message Service (EMS) messages, etc.) to and/or from another device or component (e.g., the base station 102, other UEs, etc.). The applications 150 may also include third-party applications that provide additional functionality to the UE 104. As will be discussed further herein, in configurations, the NBUE 114 may include computer-readable media 146 that may store a Type Allocation Code (TAC) for the NBUE 114, a NB-indicator (e.g., a NB-rate plan) and an International Mobile Subscriber Identity (IMSI) for the NBUE 114.

Although not illustrated in FIG. 1, the UEs 104 may also comprise various other components, e.g., a battery, a charging unit, one or more network interfaces, an audio interface, a display, a keypad or keyboard, and other input and/or output interfaces.

Although FIG. 1 illustrates only one UE (UE 104_1) and one NBUE (NBUE 114_1) in detail, each of the UEs 104_2, . . . , 104_N, as well as each of the NBUEs 114_2, . . . , 114N, may have a structure that is at least in part similar to that of the UE 104_1. For example, similar to the UE 104_1 and NBUE 114_1, each of the UEs 104_2, . . . , 104_N, as well as each of the NBUEs 114_2, . . . , NBUE 114_N, may comprise processor(s), one or more transmit antennas, one or more receive antennas, and computer-readable media including a configuration module.

In a configuration, the network settings module 130 stored in the computer-readable media 126 maintains a plurality of network settings associated with the network 100. Individual network settings maintained by the network settings module 130 may be pertinent to a single UE of the UEs 104_1, . . . , 104_N, a subset of the UEs 104_1, . . . , 104_N, or each of the UEs 104_1, . . . , 104_N. Likewise, the network settings module 130 maintains one or more settings pertinent to a single NBUE 114 or settings pertinent to a subset of the NBUEs 114_1, . . . , 114_N, or each of the NBUEs 114_1, . . . , 114_N. For example, a network setting of the plurality of network settings may specify a maximum bit rate at which a UE and/or a NBUE (or each of the UEs 104_1, . . . , 104_N, and/or NBUEs 114_1, . . . , NBUE 114_N) may transmit data to the BS 102. Another network setting of the plurality of network settings may specify a Transmit Time Interval (TTI) used by each of the UEs 104_1, . . . , 104_N, and/or NBUEs 114_1, . . . , NBUE 114N to transmit data to the BS 102. Yet another network setting of the plurality of network settings may specify a maximum power that each of the UEs 104_1, . . . , 104_N, and/or NBUEs 114_1, . . . NBUE 114N may use to transmit data to the BS 102. The plurality of network settings maintained by the network settings module 130 may also include any other appropriate type of network settings.

In a configuration, one or more of the plurality of network settings maintained by the network settings module 130 may be communicated to the UEs 104_1, . . . , 104_N, and/or the NBUEs 114_1, . . . , 114_N (e.g., by the transmit antennas 122, 122N to the receive antennas 144, of the UEs 104_1, . . . , 104_N, and/or the NBUEs 114_1, . . . , 114N). Based on receiving the network settings, the UEs 104_1, . . . , 104_N, and/or the NBUEs 114_1, . . . , NBUEs 114N (e.g., the corresponding configuration modules 148) may configure themselves and communicate with the BS 102 accordingly.

Figure 2:
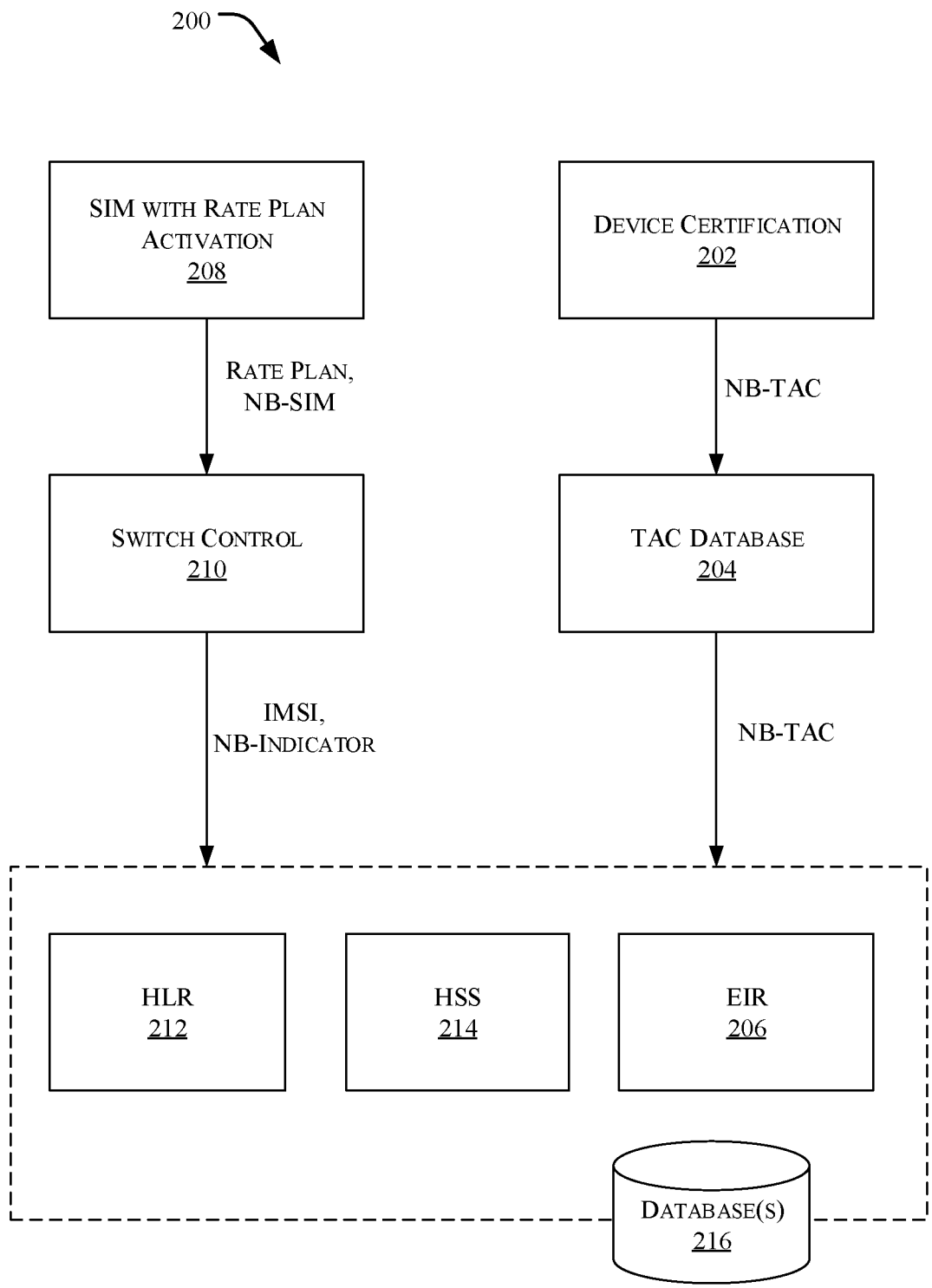
FIG. 2 is a schematic flow diagram illustrating an example method for provisioning a narrow band device for use with the narrow band network of the wireless communication network of FIG. 1, in accordance with various configurations.

FIG. 2 is a schematic flow diagram 200 illustrating an example method of provisioning the NBUE 114 for use with the narrow band network 112 of the wireless communication network 100. When the wireless communication network 100 provisions a NBUE 114, a device qualification assurance (DQA) team completes a device certification 202 that the NBUE 114 is configured as a narrow band device, e.g., the DQA team will certify that the NBUE 114 is "good to go" for use on the narrow band network 112 of the wireless communication network 100. A NB-TAC for the NBUE 114 is loaded into a TAC database 204 of the wireless communication network 100. An Equipment Identity Register (EIR) node 206 of the wireless communication network stores and/or white lists the NB-TAC against a NB International Mobile Subscriber Identity (IMSI) range.

An operator of the wireless communication network 100 activates a NB-SIM with a NB-rate plan at node 208. A switch control node 210 of the wireless communication network 100, which generally serves as the main billing node for the wireless communication network 100, receives a provision or activation request from the operator of the wireless communication network 100 and receives the NB-rate plan and NB-SIM information. The switch control node forwards a NB-indicator (e.g., the NB-rate plan) with the IMSI of the NBUE 114 to one or both of a Home Location Register (HLR) node 212 of the wireless communication network 100 or a Home Subscriber Server (HSS) node 214 of the wireless communication network 100. The NB-TAC of the NBUE 114 may also be stored in one or both of the HLR node 212 or the HSS node 214. In configurations, the EIR node 206 may also store and/or white list the IMSI and the NB-indicator, e.g., the NB-rate plan indicator for the narrow band network 112, with the NB-TAC of the NBUE 114. Thus, the NB-TAC, the IMSI and the NB-indicator are stored within one or more databases 216 of the wireless communication network 100. The NBUE 114 is now provisioned for use with the narrow band network 112 of the wireless communication network 100.

Figure 3:
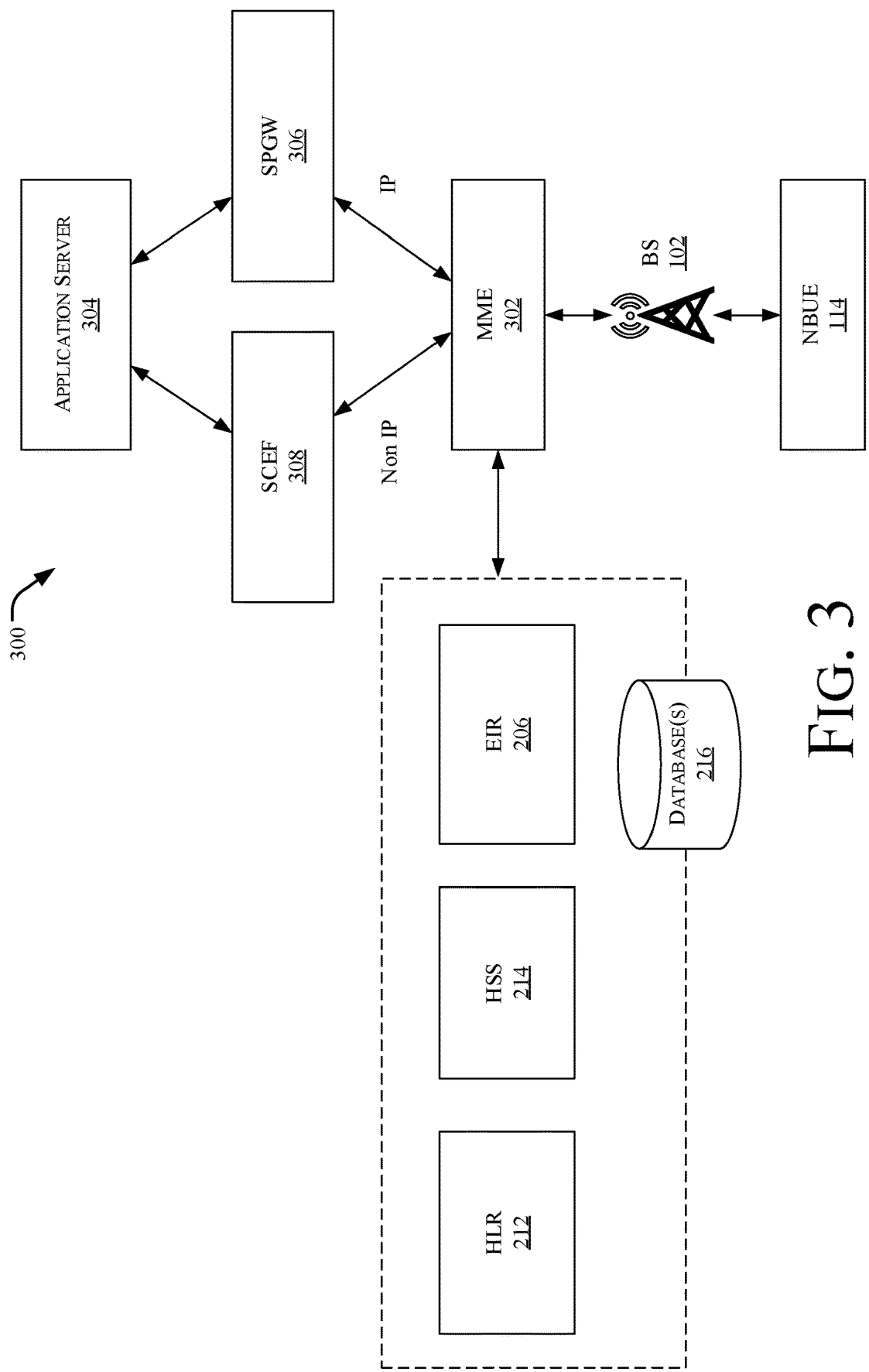
FIG. 3 is a schematic flow diagram illustrating an example method for registering the narrow band device for access to the narrow band network of the wireless communication network of FIG. 1, in accordance with various configurations.

FIG. 3 is a schematic flow diagram 300 illustrating an example method for registering the NBUE 114 for access to the narrow band network 112 of the wireless communication network 100. When the NBUE 114 attempts to attach to or register with the narrow band network 112 of the wireless communication network 100 for access, the NBUE 114 provides its NB-TAC, IMSI and NB-indicator to a Mobile Management Entity (MME) 302 of the wireless communication network 100. In configurations, the MME 302 is located in the RNC or gateway 110.

The MME 302 checks with one or more of the HLR node 212, the HSS node 214 and/or the EIR node 206 of the wireless communication network 100. The MME 302 provides the IMSI of the NBUE 114, the NB-indicator of the NBUE 114 and the NB-TAC of the NBUE 114 to one or more of the HLR node 212, the HSS node 214 and/or the EIR node 206. The node(s) check if the provided NB-TAC, IMSI and NB-indicator combination matches the NB-TAC, IMSI and NB-indicator stored within the node(s). If all three of the provided NB-TAC, IMSI and NB-indicator match the NB-TAC, IMSI and NB-indicator stored within the node(s), then the NBUE 114 is authenticated as an appropriate narrow band device and is registered with, e.g., allowed to access, the narrow band network 112 of the wireless communication network 100 via the BS 102.

Depending upon whether the NBUE 114 is attempting to access the narrow band network 112 via an Internet Protocol (IP) configuration or a non-IP configuration, the MME 302 connects the NBUE 114 with an appropriate application server 304 via either a Serving Gateway/Packet data network Gateway (SPGW) 306 of the wireless communication network 100 or a Service Capability Exposure Function (SCEF) 308 of the wireless communication network 100.

If any of the provided NB-TAC, the IMSI and/or the NB-indicator does not match with the information stored in the HLR node 210, the HSS node 212 and/or the EIR node 206 of the wireless communication network 100 (or is missing, e.g., the NB-indicator), then the NBUE 114 is not allowed to register with the narrow band network 112.

Figure 4:
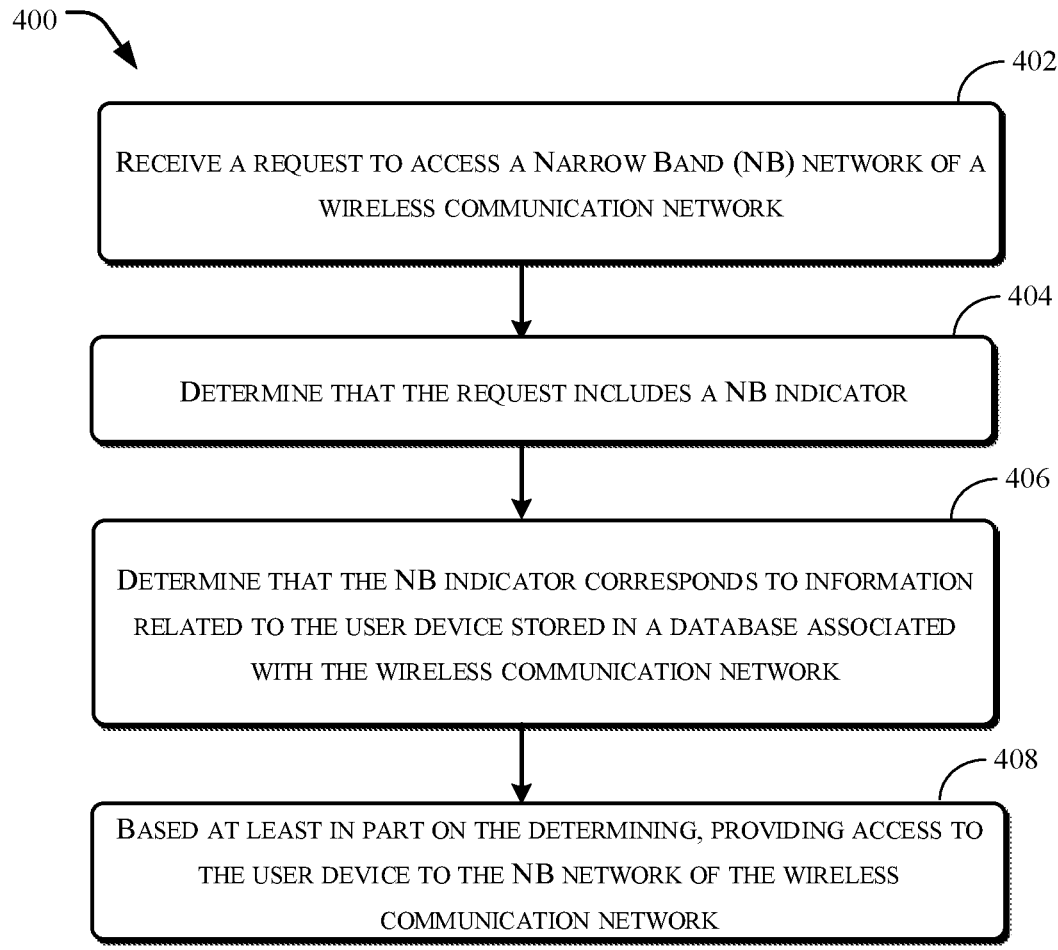
FIG. 4 is another flow diagram illustrating an example method of registering a user device for use on the narrow band network of the wireless communication network of FIG. 1, in accordance with various configurations.

FIG. 4 is a flow diagram of an illustrative process that may be implemented within or in association with the wireless communication network 100. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices.

FIG. 4 is a flow diagram illustrating an example method 400 of registering a user device, e.g., NBUE 114, for use on a narrow band network, e.g., narrow band network 112, of a wireless communication network, e.g., wireless communication network 100. As illustrated, at block 402, a request to access the narrow band network of the wireless communication network is received. For example, the request may be received from the user device by a computing device, e.g., a Mobility Management Entity (MME), e.g., MME 302. At block 404, it is determined that the request includes a NB-indicator. For example, the computing device determines that the user device's request includes a NB-indicator.

At block 406, it is determined that the NB-indicator corresponds to information related to the user device stored in a database associated with the wireless communication network. In configurations, the computing device makes the determination. At block 408, based at least in part on the determining, access to the narrow band network is provided to the user device.

Thus, using the techniques and architecture described herein, non-NB devices, e.g., UEs 104 that do not include a NB-indicator, may be prevented from accessing and utilizing data via the narrow band network 112 of the wireless communication network 100, even if the non-NB devices attempt to use a NB-SIM to access the wireless communication network 100. This can improve user experience, as well as prevent unwanted or unnecessary high charges for data use by non-NB devices that might otherwise access the narrow band network 112.

Figure 5:
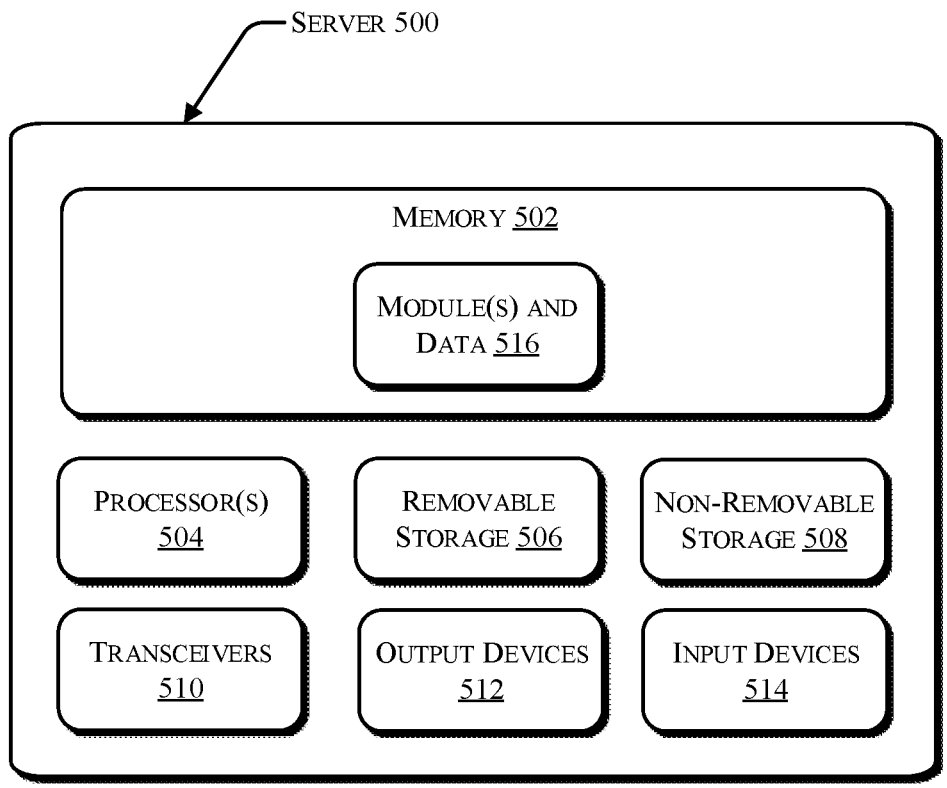
FIG. 5 schematically illustrates a component level view of a server configured for use in the wireless communication network of FIG. 1 to provide various services of the wireless communication network of FIG. 1, in accordance with various configurations.

FIG. 5 illustrates a component level view of a server 500 configured for use within a wireless communication network, e.g., wireless communication network 100, in order to provide various services within the wireless communication network, according to the techniques described herein. The server 500 may serve as the OSS server 108 or may be located in the RNC or gateway 110, e.g., one or more servers 400 may be configured to serve as the MME 302. Additionally, the server 500 may serve as a SGW or a PGW. As illustrated, the server 500 comprises a system memory 502 that may store data and one or more modules and/or applications 516 for interacting with user devices, e.g., UEs 104 and NBUEs 114, as described herein. Also, the server 500 includes processor(s) 504, a removable storage 506, a non-removable storage 508, transceivers 510, output device(s) 512, and input device(s) 514.

In various implementations, system memory 502 is volatile (such as RAM), non-volatile (such as ROM, flash memory, etc.), or some combination of the two. In some implementations, the processor(s) 504 is a Central Processing Unit (CPU), a Graphics Processing Unit (GPU), or both CPU and GPU, or any other sort of processing unit.

The server 500 may also include additional data storage devices (removable and/or non-removable) such as, for example, magnetic disks, optical disks, or tape. Such additional storage is illustrated in FIG. 5 by removable storage 506 and non-removable storage 508. The one or more of the memory 502, the removable storage 506 and/or the non-removable 508 may include module(s) and data 516 (illustrated in the memory 502). The module(s) and data 516 may include instructions executable by, for example, the processor(s) 504.

Non-transitory computer-readable media may include volatile and nonvolatile, removable and non-removable tangible, physical media implemented in technology for storage of information, such as computer readable instructions, data structures, program modules, or other data. System memory 502, removable storage 506 and non-removable storage 508 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 500. Any such non-transitory computer-readable media may be part of the server 500.

In some implementations, the transceivers 510 include any sort of transceivers known in the art. For example, the transceivers 510 may include wired communication components, such as an Ethernet port, for communicating with other networked devices. Also, or instead, the transceivers 510 may include wireless modem(s) to may facilitate wireless connectivity with other computing devices. Further, the transceivers 510 may include a radio transceiver that performs the function of transmitting and receiving radio frequency communications via an antenna.

In some implementations, the output devices 512 include any sort of output devices known in the art, such as a display (e.g., a liquid crystal display), speakers, a vibrating mechanism, or a tactile feedback mechanism. Output devices 512 also include ports for one or more peripheral devices, such as headphones, peripheral speakers, or a peripheral display.

In various implementations, input devices 514 include any sort of input devices known in the art. For example, input devices 514 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
   receiving, by a computing device of a wireless communication network and from a user device, a request to access a Narrow Band (NB) network of the wireless communication network;
   determining, by the computing device, that the request to access the NB network of the wireless communication network includes first information related to a NB rate plan of the user device;
   determining, by the computing device, that the first information related to the NB rate plan of the user device included in the request corresponds to second information related to the NB rate plan of the user device stored in a database associated with the wireless communication network;
   determining to provide access to the user device to the NB network based on the determining that the first information related to the NB rate plan of the user device included in the request corresponds to the second information related to the NB rate plan of the user device stored in the database; and
   providing, by the computing device and in response to the determining to provide access to the user device to the NB network, access to the user device to the NB network of the wireless communication network, the method further comprising:
   determining, by the computing device, that a first International Mobile Subscriber Identity (IMSI) of the user device included in the request corresponds to a second IMSI of the user device stored in the database and a first Type Allocation Code (TAC) of the user device included in the request corresponds to a second TAC of the user device stored in the database.

2. The method of claim 1, wherein:
   the determining to provide access to the user device to the NB network is further based on the determining that the first IMSI of the user device corresponds to the second IMSI of the user device stored in the database and the first TAC of the user device corresponds to the second TAC of the user device stored in the database.

3. The method of claim 2, wherein:
   the database is included within one or more of a Home Subscriber Server (HSS), a Home Location Register (HLR), or an Equipment Identity Register (EIR) of the wireless communication network; and
   the determining that the first information related to the NB rate plan of the user device included in the request corresponds to the second information related to the user device stored in the database, the first IMSI of the user device included in the request corresponds to the second IMSI of the user device stored in the database, and the first TAC of the user device included in the request corresponds to the second TAC of the user device stored in the database is performed by one or more of the HSS, the HLR, or the EIR.

4. The method of claim 1, wherein the computing device is a Mobile Management Entity (MME) of the wireless communication network.

5. The method of claim 4, wherein providing access to the user device to the NB network of the wireless communication network comprises providing, by the MME, access to the user device to the NB network of the wireless communication network via one of (i) a Service Capability Exposure Function (SCEF) or (ii) a Serving Gateway/Packet Data Network Gateway (SPGW) of the wireless communication network.

6. The method of claim 1, wherein the computing device is configured as an Internet of Things (IoT) device.

7. An apparatus configured for operation within a wireless communication network, the apparatus comprising:
   one or more processors; and
   a non-transitory storage medium comprising instructions stored thereon, the instructions being executable by the one or more processors to:
   receive, from a user device, a request to access a Narrow Band (NB) network of the wireless communication network;
   determine that the request to access the NB network of the wireless communication network includes a first information related to a NB rate plan of the user device;
   determine that the first information related to the NB rate plan of the user device included in the request corresponds to second information related to the NB rate plan of the user device stored in a database associated with the wireless communication network;
   determine to provide access to the user device to the NB network based on the determining that the first information related to the NB rate plan of the user device included in the request corresponds to the second information related to the NB rate plan of the user device stored in the database; and
   provide, in response to the determining to provide access to the user device to the NB network, access to the user device to the NB network of the wireless communication network, wherein the instructions are further executable by the one or more processors to:
   determine that a first International Mobile Subscriber Identity (IMSI) of the user device included in the request corresponds to a second IMSI of the user device stored in the database and a first Type Allocation Code (TAC) of the user device included in the request corresponds to a second TAC of the user device stored in the database.

8. The apparatus of claim 7, wherein:
   the determining to provide access to the user device to the NB network is further based on the determining that the first IMSI of the user device included in the request corresponds to the second IMSI of the user device stored in the database and the first TAC of the user device included in the request corresponds to the second TAC of the user device stored in the database.

9. The apparatus of claim 8, wherein the database is included within one or more of a Home Subscriber Server (HSS), a Home Location Register (HLR), or an Equipment Identity Register (EIR) of the wireless communication network.

10. The apparatus of claim 7, wherein the apparatus is included within a Mobile Management Entity (MME) of the wireless communication network.

11. The apparatus of claim 10, wherein providing access to the user device to the NB network of the wireless communication network comprises providing, by the MME, access to the user device to the NB network of the wireless communication network via one of (i) a Service Capability Exposure Function (SCEF) or (ii) a Serving Gateway/Packet Data Network Gateway (SPGW) of the wireless communication network.

12. The apparatus of claim 7, wherein the computing device is configured as an Internet of Things (IoT) device.

13. A non-transitory storage medium comprising instructions stored thereon, the instructions being executable by one or more processors to:
   receive, from a user device, a request to access a Narrow Band (NB) network of a wireless communication network;
   determine that the request to access the NB network of the wireless communication network includes a first information related to a NB rate plan of the user device;
   determine that the first information related to the NB rate plan of the user device included in the request corresponds to second information related to a NB rate plan of the user device stored in a database associated with the wireless communication network;
   determine to provide access to the user device to the NB network based on the determining that the first information related to the NB rate plan of the user device included in the request corresponds to the second information related to the NB rate plan of the user device stored in the database; and
   provide, in response to the determining to provide access to the user device to the NB network, access to the user device to the NB network of the wireless communication network, wherein the instructions are further executable by the one or more processors to:
   determine that a first International Mobile Subscriber Identity (IMSI) of the user device included in the request corresponds to a second IMSI of the user device stored in the database and a first Type Allocation Code (TAC) of the user device included in the request corresponds to a second TAC of the user device stored in the database.

14. The non-transitory storage medium of claim 13, wherein
   the determining to provide access to the user device to the NB network is further based on the determining that the first IMSI of the user device included in the request corresponds to the second IMSI of the user device stored in the database and the first TAC of the user device included in the request corresponds to the second TAC of the user device stored in the database.

15. The non-transitory storage medium of claim 14, wherein the database is included within one or more of a Home Subscriber Server (HSS), a Home Location Register (HLR), or an Equipment Identity Register (EIR) of the wireless communication network.

16. The non-transitory storage medium of claim 13, wherein the non-transitory storage medium is included within a Mobile Management Entity (MME) of the wireless communication network.

17. The non-transitory storage medium of claim 16, wherein providing access to the user device to the NB network of the wireless communication network comprises providing, by the MME, access to the user device to the NB network of the wireless communication network via one of (i) a Service Capability Exposure Function (SCEF) or (ii) a Serving Gateway/Packet Data Network Gateway (SPGW) of the wireless communication network.

* * * * *